July 16, 1929.  M. L. SPAHR  1,720,766
CENTRIFUGAL OPERATING MECHANISM
Filed Sept. 2, 1927
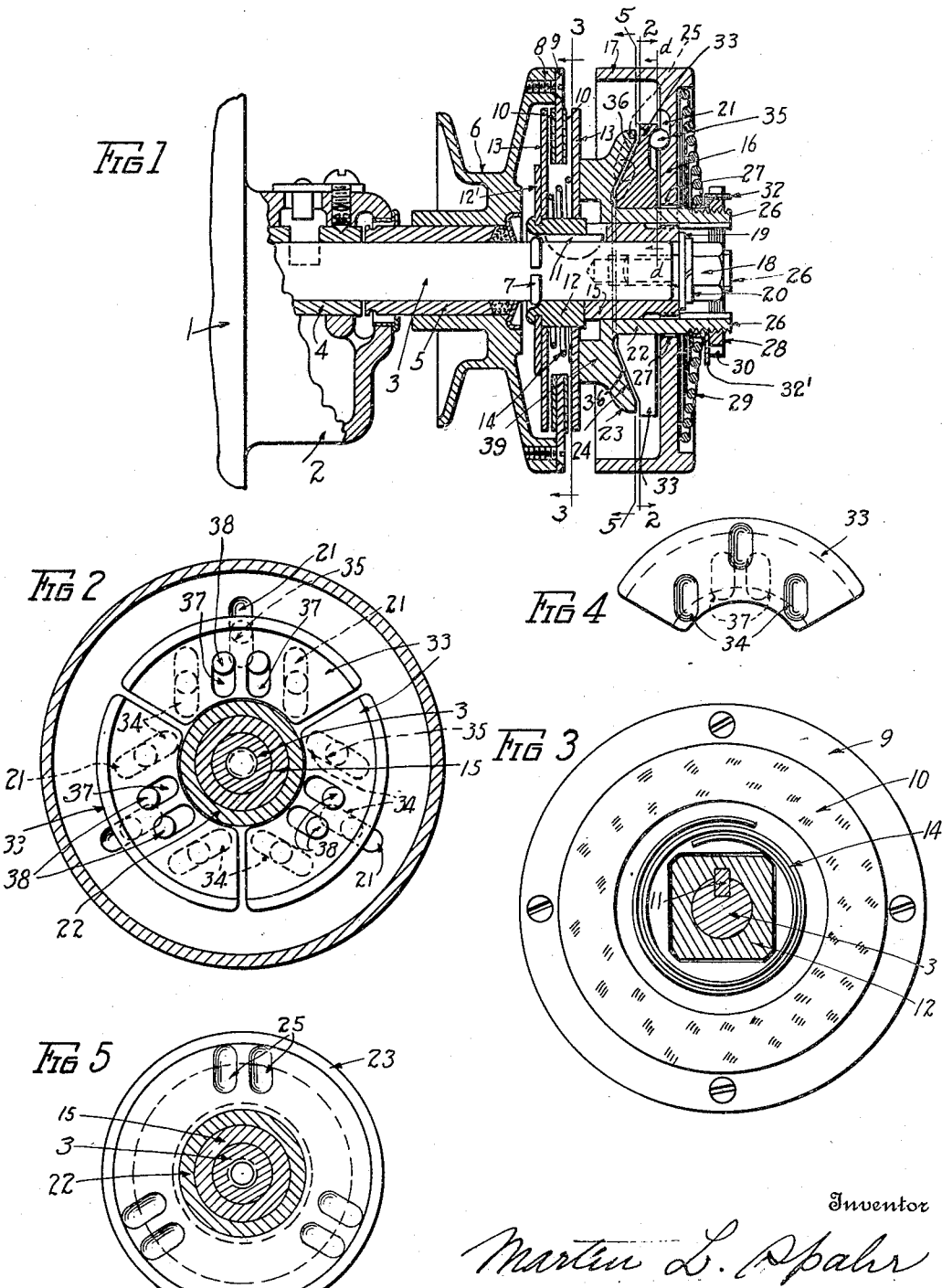
Inventor
Martin L. Spahr
By Staley & Welch
Attorneys Patented July 16, 1929.

1,720,766

UNITED STATES PATENT OFFICE.

MARTIN L. SPAHR, OF SPRINGFIELD, OHIO, ASSIGNOR, BY MESNE ASSIGNMENTS, TO ROBBINS & MYERS, INC., OF SPRINGFIELD, OHIO, A CORPORATION OF OHIO.

CENTRIFUGAL OPERATING MECHANISM.

Application filed September 2, 1927. Serial No. 217,293.

My invention relates to centrifugal operating devices.

The object of my invention is to provide an operating device of this character which will be simple in construction, economical in manufacture and effective in operation.

In the accompanying drawings:

Fig. 1 is a longitudinal section of a mechanism embodying my improvements, shown applied to the shaft of an electric motor.

Fig. 2 is a section on the line 2—2 of Fig. 1.

Fig. 3 is a section on the line 3—3 of Fig. 1.

Fig. 4 is an elevation of one of the weights, looking at the opposite side from that shown in Fig. 2.

Fig. 5 is a partial section on the line 5—5 of Fig. 1.

Referring to the drawings, 1 represents a portion of the casing of an electric motor, 2 the bearing housing and 3 the motor shaft which is journaled in a suitable bearing sleeve or bushing 4 supported by the housing, the shaft being extended outwardly beyond the housing. Journaled loosely upon the shaft adjacent the housing is a bushing 5 of a driven member, shown in the present case as a pulley 6, the pulley and its bushing being permitted a limited axial movement on the shaft. The pulley has a laterally extending peripheral flange 8 to the outer side of which is secured an annular ring 9 forming one member of a clutch, both sides of this ring being preferably faced with rings of cork 10 or other suitable material.

Keyed to the shaft by a key 11 is a sleeve 12 square in cross section, this sleeve being confined against axial movement in one direction by a ring 7 located in a groove in the shaft. Loosely mounted upon this sleeve is a pair of disks 13, each disk having a square opening fitted to the sleeve so as to rotate therewith; the inner end of the sleeve having secured thereto a disk 12' to act as an abutment. These disks are maintained normally separated by a coil spring 14 placed between the disks, and the ring 9 and its cork faces occupy a position between the disks.

Also mounted upon the shaft to rotate therewith is a member consisting of a hub portion 15, a web portion 16 and overhanging rim 17. The hub is clamped against the sleeve 12 by a cap screw 18 threaded in the shaft and a washer 19, a lock washer 20 being also preferably employed. The inner face of the web 16 extends on lines which are perpendicular with respect to the longitudinal axis of the driving shaft and is provided with a plurality of series of pockets 21, three series of these pockets being employed in the present case. Each of these pockets is of elongated character arranged perpendicular to the longitudinal axis of the shaft.

Mounted upon the hub 15 is a sleeve 22 having at its end a flange 23 provided on one side with an inclined face 24 having three pairs of elongated pockets 25, the bottom walls of which are inclined to the longitudinal axis of the shaft. This sleeve is mounted for axial movement upon the hub 15 and has prongs or extensions 26 which project through openings 27 in the web 16 which are externally threaded to receive a nut 28. A coil spring 29 is interposed between the web and the nut, the nut having notches 30 on its periphery to receive lugs 32 formed on the periphery of a sheet metal washer 32' which has its inner edge bent to form a seat for the inner coil of the spring 29 and also has integral lugs (not shown) which extend between the prongs 26; this washer serving to hold the nut in different positions of adjustment. The web 16 and flange 23 cooperate to provide an annular pocket, one wall of which is inclined.

Mounted in the annular pocket formed by the web and flange is a series of weights 33 of segmental form, the weights being held frictionally between these parts so as to revolve therewith. One side of each weight is extended on a perpendicular line to conform to the inner face of the web 16, and has a series of pockets 34 corresponding to the pockets 21 to receive balls 35. The other side of each weight is formed with an inclined face 36 and has elongated pockets 37 corresponding to the pockets 25 of the flange 23 in which are placed balls 38.

The pockets 21, 25, 34 and 37 are each of uniform depth throughout its length so that the balls will be uniformly confined in the pockets in all positions of their outward travel to eliminate danger of the balls traveling out of the pockets.

In operation when the motor acquires a predetermined speed the weights moving by centrifugal force slide the flange 23 axially and cause the annular boss 39 thereon to press the disks into driving engagement to rotate the pulley. As the weights move inwardly upon decreased speed of the motor the spring 29 throws the flange to inoperative position to disengage the clutch members; the spring 14 tending to separate the disks a sufficient distance to prevent dragging.

Having thus described my invention, I claim:

1. In an operating mechanism of the character described, a rotatable element, a plurality of weights disposed about the same and rotatable therewith so as to move radially by centrifugal force, an annular abutment member on said element having pockets therein arranged to register with corresponding pockets in said weights, a member mounted on said element movable toward and from said abutment, said movable member having pockets arranged to register with corresponding pockets in said weights, adjacent faces of at least one of each of said weights and one of said members inclined to the axis of rotation, the pockets in said inclined faces being correspondingly inclined, each pocket being elongated in a direction corresponding to the movement of the weights and being of substantially uniform depth throughout its length, and balls in said pockets.

2. In a centrifugal operating mechanism, a rotatable element, a plurality of weights each having at least one inclined face, an abutment member on one side of said weights, an axially movable member on the opposite side of said weights, one at least of said members having an inclined face to cooperate with the inclined faces of said weights, said weights and members having cooperating pockets, and balls in said pockets, each pocket being elongated in a direction corresponding to the movement of the weights and being of substantially uniform depth throughout its length, the bottoms of those pockets arranged in the inclined faces of the parts being correspondingly inclined.

3. In a centrifugal operating mechanism, a rotatable shaft, an abutment member held against axial movement mounted upon said shaft to rotate therewith, an axially movable member carried by said abutment member, inclined weights between the opposing faces of said members, one at least of said members having an inclined face to cooperate with the inclined faces of said weights, said weights and members having cooperating pockets, and balls in said pockets, each pocket being elongated in a direction corresponding to the movement of the weights and being of substantially uniform depth throughout its length, the bottoms of those pockets arranged in the inclined faces of the parts being correspondingly inclined and said pockets being provided with end walls.

In testimony whereof, I have hereunto set my hand this 30th day of August, 1927.

MARTIN L. SPAHR.